(12) United States Patent
Burke et al.

(10) Patent No.: US 6,213,170 B1
(45) Date of Patent: Apr. 10, 2001

(54) VALVELESS FUEL TANK ASSEMBLY

(75) Inventors: David Howard Burke, Flint; Mahlon Richard Pachciarz, Grand Blanc, both of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/466,959

(22) Filed: Dec. 20, 1999

(51) Int. Cl.$^7$ ..................................................... B65B 31/00
(52) U.S. Cl. ............................... 141/59; 141/44; 141/47; 141/50; 141/59; 141/65; 141/66; 141/197; 137/588
(58) Field of Search ............................. 141/44, 47, 50, 141/52, 59, 65, 66, 94, 95, 192, 197, 198; 123/516–521; 137/39, 110, 587, 588; 220/86.1, 86.2

(56) References Cited

U.S. PATENT DOCUMENTS 4,751,940  6/1988  Bergsma et al. .
5,680,848 * 10/1997  Katoh et al. .......................... 123/518

FOREIGN PATENT DOCUMENTS

2327460 * 1/1999 (GB) .

* cited by examiner

Primary Examiner—Timothy L. Maust
(74) Attorney, Agent, or Firm—Vincent A. Cichosz

(57) ABSTRACT

A valveless fuel tank assembly for a vehicle including a fuel tank having an interior chamber to hold fuel therein. The valveless fuel tank assembly also includes a vapor canister to adsorb fuel vapor in the fuel tank. The valveless fuel tank assembly includes a fill-limit tube connected to the fuel tank and communicating with the interior chamber and a tank vent tube connected to the vapor canister and operatively connected to the fill-limit tube. The valveless fuel tank assembly further includes an oleophobic filter connected to the fill-limit tube to allow vapor fuel to communicate with the vapor canister and to prevent liquid fuel from communicating with the vapor canister.

20 Claims, 3 Drawing Sheets

VALVELESS FUEL TANK ASSEMBLY

TECHNICAL FIELD

The present invention relates generally to fuel tanks for vehicles and, more particularly, to a valveless fuel tank assembly for a vehicle.

BACKGROUND OF THE INVENTION

It is known to provide a fuel tank in a vehicle to hold fuel to be used by an engine of the vehicle. It is also known to provide a vapor recovery and storage system for the fuel tank of the vehicle. Typically, the vapor recovery and storage system includes a vapor canister remotely mounted such as in an engine compartment of the vehicle and operatively connected by separate external valves and lines to the fuel tank. The fuel tank is maintained near atmospheric temperature by venting it through the carbon canister.

If liquid fuel gets into the canister, some of the canister's ability to trap hydrocarbons is lost. Presently, liquid fuel is kept out of the canister and in the fuel tank by a combination of valves, torturous paths and gravity. Typically, floated rollover valves and a relatively expensive refueling vent valve (FLVV) are used to keep liquid fuel out of the canister while driving and during rollovers. However, this is only partially successful since some liquid still gets through to the canister. One approach is to put the canister lower, and even in the fuel tank, severely limiting the use of gravity to keep liquid out of the canister. Also, the use of valves is relatively complex and costly.

Therefore, it is desirable to eliminate relatively complex and costly valves for a fuel tank. It is also desirable to provide a valveless fuel tank vapor venting and/or vapor recovery fill level control. It is further desirable to provide a valveless fuel tank assembly that is relatively simple and lower in cost.

SUMMARY OF THE INVENTION

It is, therefore, one object of the present invention to provide a valveless fuel tank assembly for a vehicle.

It is another object of the present invention to provide a valveless fuel tank assembly for a vehicle that keeps liquid fuel from getting into an evaporative emission or vapor canister.

It is yet another object of the present invention to provide a valveless fuel tank assembly for a vehicle that replaces the valves such as the refueling vent valve that keep liquid fuel from entering the vapor canister.

To achieve the foregoing objects, the present invention is a valveless fuel tank assembly for a vehicle including a fuel tank having an interior chamber to hold fuel therein. The valveless fuel tank assembly also includes a vapor canister to adsorb fuel vapor, which may be in the fuel tank. The valveless fuel tank assembly includes a fill-limit tube connected to the fuel tank and communicating with the interior chamber and a tank vent tube connected to the vapor canister and operatively connected to the fill-limit tube. The valveless fuel tank assembly further includes an oleophobic filter connected to at least one of the fill-limit tube and the tank vent tube to allow vapor fuel to communicate with the vapor canister and to prevent liquid fuel from communicating with the vapor canister.

One advantage of the present invention is that a valveless fuel tank assembly is provided for a vehicle. Another advantage of the present invention is that the valveless fuel tank assembly has an oleophobic material that replaces vent valves in a fuel system of the vehicle. Yet another advantage of the present invention is that the valveless fuel tank assembly incorporates a relatively simple oleophobic fabric barrier that allows vapor to pass but not hydrocarbon based liquids. Still another advantage of the present invention is that the valveless fuel tank assembly is relatively simple and less costly than rollover valves currently used. A further advantage of the present invention is that the valveless fuel tank assembly is also lighter and more effective at keeping liquid fuel out of the vapor canister under severe driving conditions. Yet a further advantage of the present invention is that the valveless fuel tank assembly has an oleophobic fabric barrier with a sufficiently small pore size that prevents liquid fuel from passing therethrough but allows vapor to pass therethrough. Still a further advantage of the present invention is that the valveless fuel tank allows the refueling vent valve (FLVV) to be replaced with a simple fill-limit tube, protected with the oleophobic barrier.

Other objects, features and advantages of the present invention will be readily appreciated, as the same becomes better understood, after reading the subsequent description taken in conjunction with the accompanying drawings.

DESCRIPTION OF THE PREFERRED EMBODIMENT

Figure 1:
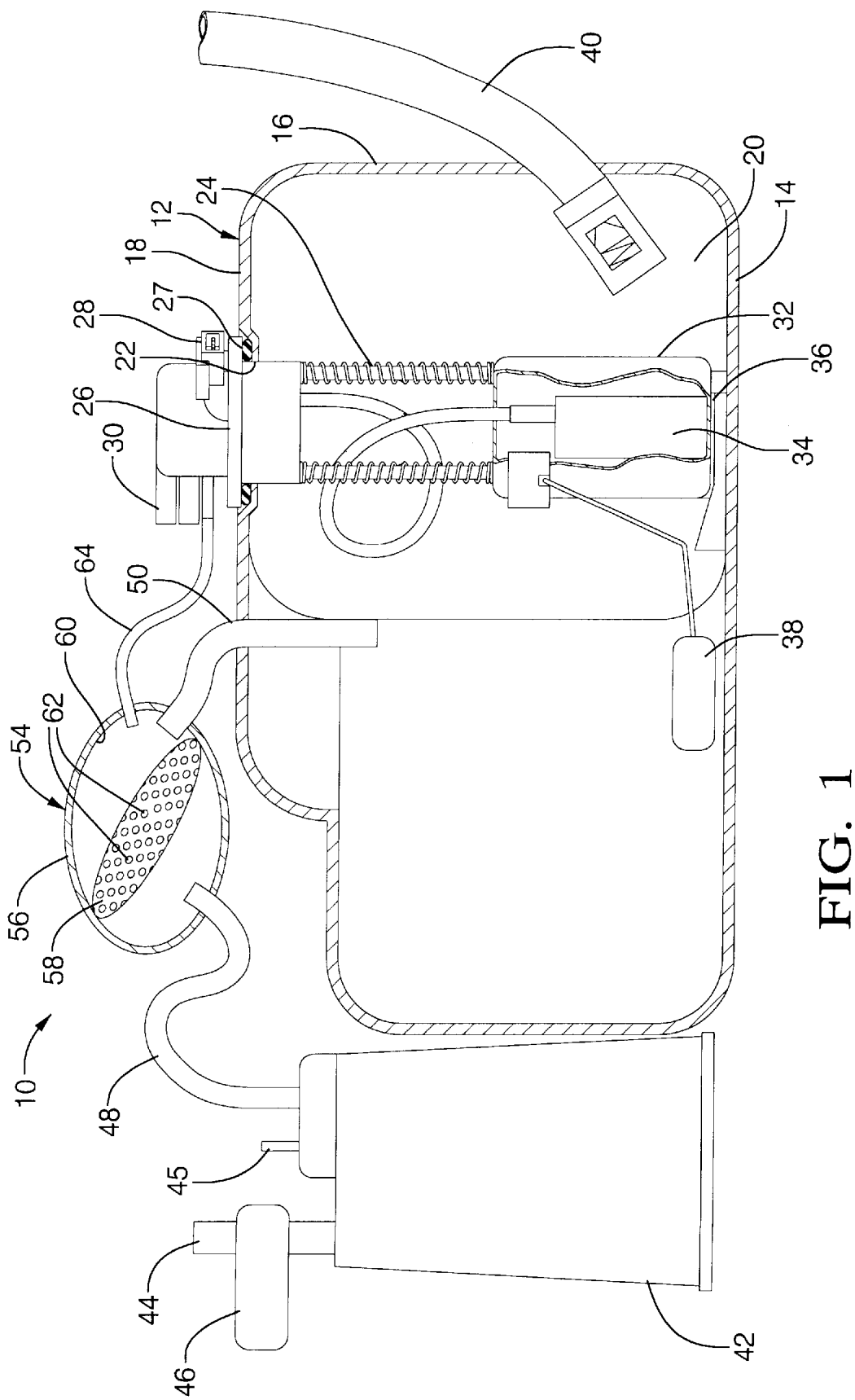
FIG. 1 is a fragmentary elevational view of a valveless fuel tank assembly, according to the present invention.

Referring to the drawings and in particular FIG. 1, one embodiment of a valveless fuel tank assembly 10, according to the present invention, is shown for a vehicle (not shown). The valveless fuel tank assembly 10 includes a fuel tank, generally indicated at 12, to hold liquid fuel. In this embodiment, the fuel tank 12 includes a bottom or base wall 14 and a side wall 16 extending around a periphery of the base wall 14 and generally perpendicular thereto. The fuel tank 12 also includes a top wall 18 extending generally perpendicular to the side wall 16 to form an interior chamber 20. The fuel tank 12 further includes a tank opening 22 formed in the top wall 18 communicating with the interior chamber 20. The fuel tank 12 includes a fuel pump module 24 extending through the tank opening 20 and disposed in the interior chamber 20. The fuel pump module 24 has a removable cover 26 sealed by a seal 27 to the top wall 18 of the fuel tank 12 and an electrical connector 28 and a fuel line outlet connector 30. The fuel tank 12 also includes a fuel reservoir 32 which contains an electrical fuel pump 34 with an inlet 36 and a float gage 38 to indicate fuel level. The fuel tank 12 also includes a tank filler neck tube 40 having an upper end (not shown) provided with a removable fuel cap (not shown) mounted in a vehicle body (not shown) of the vehicle and a lower end extending though the fuel tank 12 and communicating with the interior chamber 20. The fuel tank 12 may be formed of a metal or plastic material.

The valveless fuel tank assembly also includes a vapor or carbon canister 42 disposed outside of the fuel tank 12 and located in a remote location such as an engine compartment (not shown) of the vehicle. The vapor canister 42 has a canister bed (not shown) disposed therein of a vapor adsorbing material such as activated carbon. The vapor canister 42 also has a canister vent tube 44 and a vent solenoid valve 46 fluidly connected to the canister vent tube 44 and electrically connected to a source of power (not shown). The vent solenoid valve 46 is cycled to provide outside air to the canister bed. It should be appreciated that the vapor canister 42 is conventional and known in the art.

The valveless fuel tank assembly 10 includes a tank vent tube 48 having one end extending into a housing 56 of an oleophobic filter 54 to be described and another end connected to the vapor canister 42. The tank vent tube 48 is made of a flexible material. The valveless fuel tank assembly 10 also includes a fill-limit tube 50 having one extending through the top wall 18 and into the interior chamber 20 of the fuel tank 12 a predetermined distance that will determine how high the fuel may be filled. The fill-limit tube 50 has another end extending into the housing 56 of the oleophobic filter 54 to be described. The fill-limit tube 50 is made of a rigid material.

The valveless fuel tank assembly 10 includes a oleophobic filter, generally indicated at 54, connected to the fill-limit tube 50 and the tank vent tube 48. The oleophobic filter 54 includes a housing 56 and an oleophobic fabric barrier 58 disposed in the housing 56. The housing 56 is generally oval shaped, although may be any suitable shape, to form a filter chamber 60 to receive the oleophobic fabric barrier 58 therein. The fill-limit tube 50 extends through the housing 56 and communicates with the filter chamber 60 on one side of the oleophobic fabric barrier 58. The tank vent tube 48 extends through the housing 56 and communicates with the filter chamber 60 on the other side of the oleophobic fabric barrier 58. The oleophobic fabric barrier 58 has a plurality of pores 62 to create a liquid-proof barrier between the fuel tank 12 and the vapor canister 42. The pores 62 of the oleophobic fabric barrier 58 are of a size to allow vapor to pass but not hydrocarbon based liquids. Such an oleophobic fabric barrier is commercially available from Pall Specialty Materials of Port Washington, New York. The valveless fuel tank assembly 10 may include a grade vent line or tube 64 connected to the housing 56 on a liquid side of the oleophobic fabric barrier 58 and to the fuel pump module 24 or other locations at the top wall 18 to allow venting of air inside the interior chamber 20 of the fuel tank 12 when the fill-limit tube 50 is blocked by liquid fuel. It should be appreciated that the oleophobic fabric barrier 58 can hold over twelve inches $H_2O$ of pressure without passing liquid. It should also be appreciated that any liquid splashing out of the fuel tank 12 will roll off the oleophobic fabric barrier 58 and drain back down the fill-limit tube 50.

In operation of the valveless fuel tank assembly 10, the fuel tank 12 holds the fuel. The fill-limit tube 50 allows vapor fuel to escape at a high flow rate for refueling the vehicle, once the liquid fuel blocks the end, pressure builds and a fuel dispensing pump (not shown) shuts off. If it is desirable to allow the operator to slowly add some more fuel, a hole (not shown) may be provided in a side of the fill-limit tube 50 at the height where the fuel tank 12 is the fullest. Vapor and air from the fuel tank 12 can escape through the fill-limit tube 50 and tank vent tube 48 to the vapor canister 42 where the fuel vapor is held by the canister bed and the air exits. If the fuel tank 12 is under vacuum, then the flow reverses with air coming in the vent tube 44, past the valve 46, through the vapor canister 42, tank vent tube 48 and fill-limit tube 50 and into the fuel tank 12. The oleophobic filter 54 allows this vapor and air exchange with little pressure drop. When driving on rough roads or steep grades, some liquid fuel may splash or run into the fill-limit tube 48. When this liquid fuel reaches the oleophobic filter 54, it is blocked. The blocked liquid fuel can drain back to the fuel tank 12 once the vehicle returns to a level attitude and zero acceleration. The vapor canister 42 is cleaned by drawing the vapor fuel out to the engine to be burned through a purge tube 45. If the vehicle were to roll over in an accident, the oleophobic filter 54 would keep the liquid fuel from running out of the fuel tank 12 and through the vapor canister 42. It should be appreciated that the oleophobic filter 54 may be placed anywhere between the fuel tank 12 and vapor canister 42. It should also be appreciated that the oleophobic filter 54 may be used as redundant barriers in systems with FLVV and/or vent valves for increased security. It should further be appreciated that the oleophobic filter 54 may also be placed on a fresh air port of the vapor canister as a final rollover protection and to keep water from entering the vapor canister 42 when fording with the vehicle. It should still further be appreciated that the pumping of liquid fuel and purging of vapor fuel is conventional and known in the art.

Figure 2:
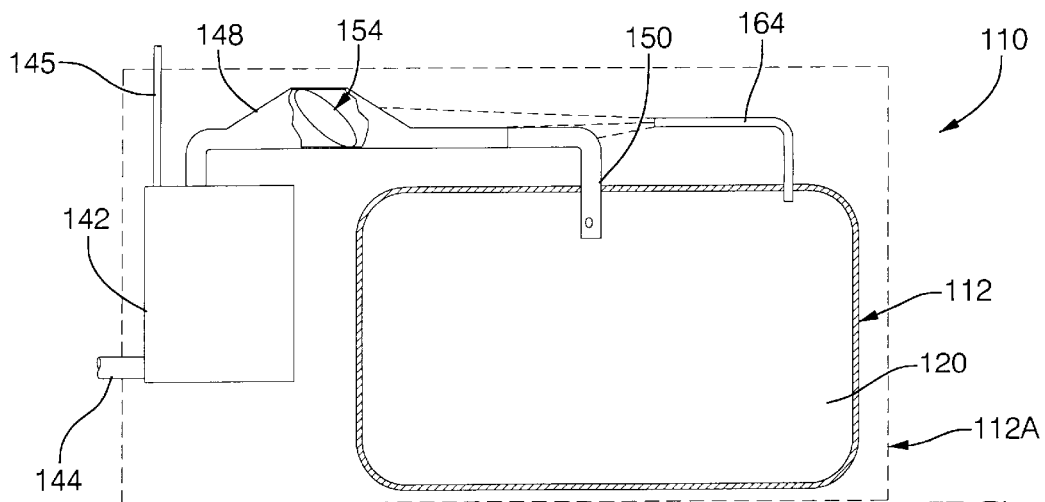
FIG. 2 is a diagrammatic view of another embodiment, according to the present invention, of the valveless fuel tank assembly of FIG. 1.

Referring to FIG. 2, another embodiment 110, according to the present invention, of the valveless fuel tank assembly 10 is shown. Like parts of the valveless fuel tank assembly 10 have like reference numerals increased by one hundred (100). In this embodiment, the valveless fuel tank assembly 110 includes the oleophobic filter 154 disposed in the tank vent tube 148. The valveless fuel tank assembly 110 includes the grade vent tube 164 having one end extending through the fuel tank 112 and into the interior chamber 120. The grade vent tube 164 has another end, which may be connected to the fill-limit tube 150, tank vent tube 148, or to the oleophobic filter 154. The valveless fuel tank assembly 110 may have the fuel tank 112 formed of a sufficient size to contain the vapor canister 142, tank vent tube 148, fill-limit tube 150 and grade vent tube 164 as indicated by the broken lines 112*a*. The operation of the valveless fuel tank assembly 110 is similar to the valveless fuel tank assembly 10.

Figure 3:
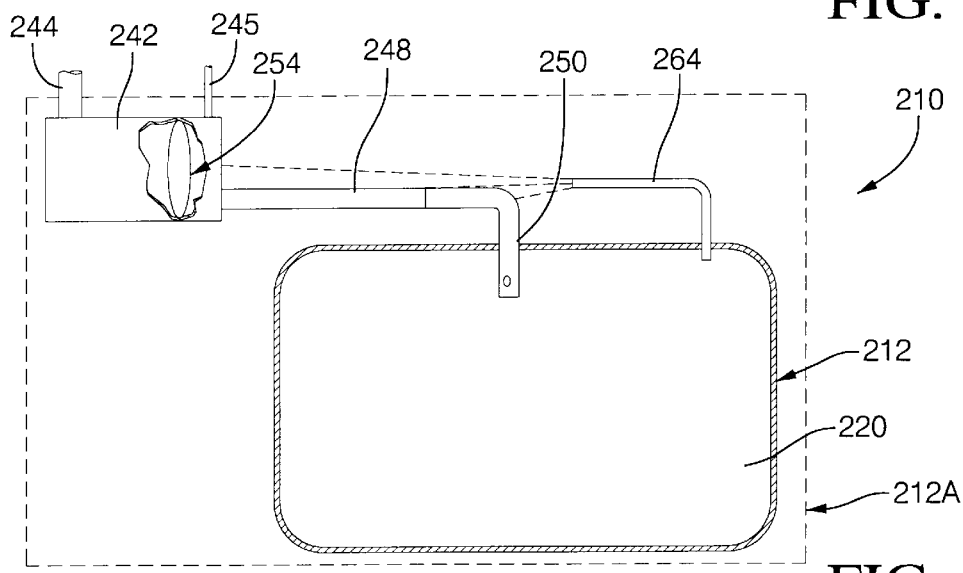
FIG. 3 is a diagrammatic view of yet another embodiment, according to the present invention, of the valveless fuel tank assembly of FIG. 1.

Referring to FIG. 3, yet another embodiment 210, according to the present invention, of the valveless fuel tank assembly 10 is shown. Like parts of the valveless fuel tank assembly 10 have like reference numerals increased by two hundred (200). In this embodiment, the valveless fuel tank assembly 210 includes the oleophobic filter 254 disposed in the vapor canister 242. The valveless fuel tank assembly 210 includes the grade vent tube 264 having one end extending through the fuel tank 212 and into the interior chamber 220. The grade vent tube 264 has another end, which may be connected to the fill-limit tube 250, tank vent tube 148, or to the oleophobic filter 254. The valveless fuel tank assembly 210 may have the fuel tank 212 formed of a sufficient size to contain the vapor canister 242, vent tank tube 248, fill-limit tube 250 and grade vent tube 264 as indicated by the broken lines 212*a*. The operation of the valveless fuel tank assembly 210 is similar to the valveless fuel tank assembly 110.

Figure 4:
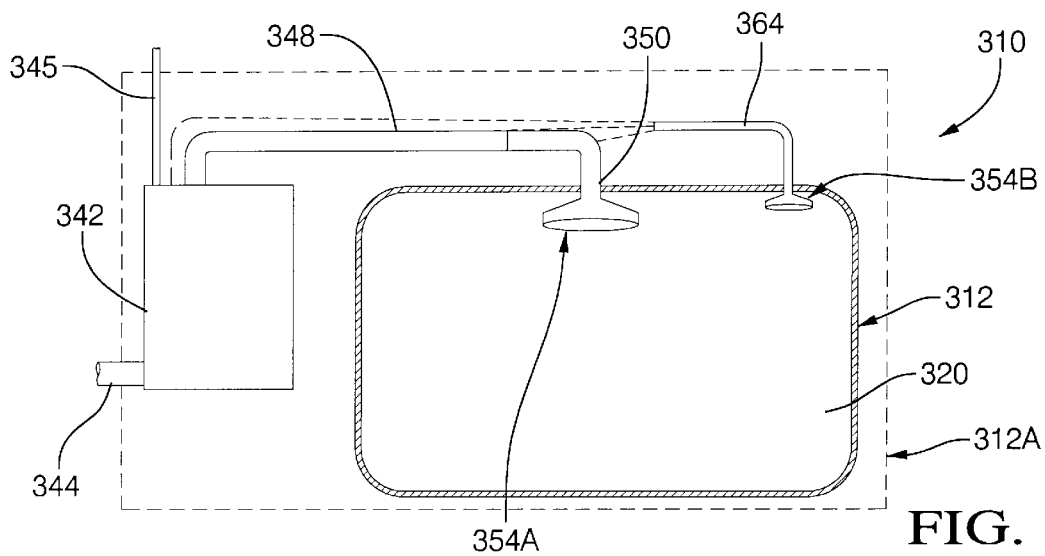
FIG. 4 is a diagrammatic view of still another embodiment, according to the present invention, of the valveless fuel tank assembly of FIG. 1.

Referring to FIG. 4, still another embodiment 310, according to the present invention, of the valveless fuel tank assembly 10 is shown. Like parts of the valveless fuel tank assembly 10 have like reference numerals increased by three hundred (300). In this embodiment, the valveless fuel tank assembly 310 includes a first oleophobic filter 354a and a second oleophobic filter 354b disposed in the interior chamber 320 of the fuel tank 312. The first oleophobic filter 354a is connected to the fill-limit tube 350. The valveless fuel tank assembly 310 includes the grade vent tube 364 having one end extending through the fuel tank 312 and into the interior chamber 320 and connected to the second oleophobic filter 354b. The grade vent tube 364 has another end, which may be connected to the fill-limit tube 350, tank vent tube 348, or to the vapor canister 342. The valveless fuel tank assembly 310 may have the fuel tank 312 formed of a sufficient size to contain the vapor canister 342, tank vent tube 348, fill-limit tube 350 and grade vent tube 364 as indicated by the broken lines 312a. The operation of the valveless fuel tank assembly 310 is similar to the valveless fuel tank assembly 10.

Figure 5:
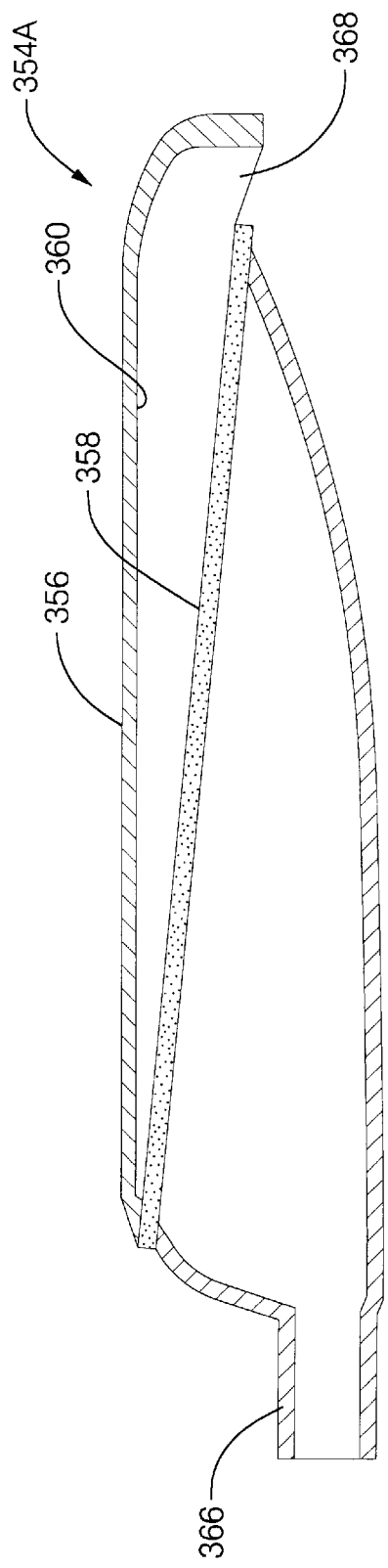
FIG. 5 is a fragmentary elevational view of a portion of the valveless fuel tank assembly of FIG. 4.
Figure 6:
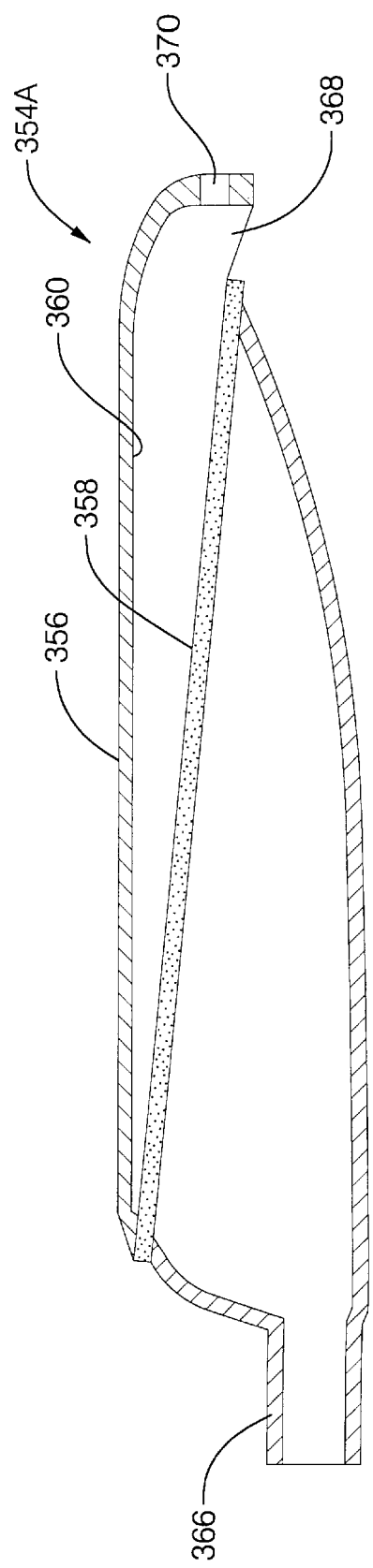
FIG. 6 is a view similar to FIG. 5 of another embodiment of the portion of the valveless fuel tank assembly of FIG. 4.

Referring to FIGS. 5 and 6, the oleophobic filter 354 includes the housing 356 having a relatively thin profile and a generally circular shape. The housing 356 has a fitting 366 for connection to the tank vent tube 348. The oleophobic filter 354 also includes the oleophobic fabric barrier 358 disposed in the filter chamber 360 of the housing 356 at such an angle that any liquid which gets into the housing 356 rolls down the oleophobic fabric barrier 358 and out of the housing 356. The oleophobic filter 354 is disposed within the fuel tank 20 at or near a top of the fuel tank 20. The housing 356 has an opening 368 cut at an angle to a horizontal plane to allow slow fill to a secondary shut-off (not shown) and also softens pressure spike of a primary shutoff (not shown) of a dispensing nozzle for the fuel tank 20 when the fuel tank 20 is full. As illustrated in FIG. 6, the housing 356 may include an optional hole or aperture 370 extending therethrough to act as a second fill shut-off point. It should be appreciated that the housing 356 is integral with the tank vent tube 348 and placed in the fuel tank 312, allowing liquid fuel, blocked by the barrier 358, to drain back into the fuel tank 312 and allowing the fuel tank 312 to be filled up very close to the top thereof.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A valveless fuel tank assembly for a vehicle comprising:
   a fuel tank having an interior chamber to hold fuel therein;
   a vapor canister to adsorb fuel vapor in said fuel tank;
   a fill-limit tube connected to said fuel tank and communicating with said interior chamber;
   a tank vent tube connected to said vapor canister and operatively connected to said fill-limit tube; and
   an oleophobic filter connected to at least one of said fill-limit tube and said tank vent tube to allow vapor fuel to communicate with said vapor canister and to prevent liquid fuel from communicating with said vapor canister.

2. A valveless fuel tank assembly as set forth in claim 1 wherein said oleophobic filter comprises a housing and an oleophobic fabric barrier disposed in said housing.

3. A valveless fuel tank assembly as set forth in claim 1 wherein said oleophobic filter is connected between one end of said tank vent tube and one end of said fill-limit tube.

4. A valveless fuel tank assembly as set forth in claim 1 wherein said oleophobic filter is disposed within said tank vent tube.

5. A valveless fuel tank assembly as set forth in claim 1 wherein said oleophobic filter is connected to one end of said fill-limit tube and disposed in said interior chamber of said fuel tank.

6. A valveless fuel tank assembly as set forth in claim 1 wherein said oleophobic filter is connected to one end of said tank vent tube and disposed in said vapor canister.

7. A valveless fuel tank assembly as set forth in claim 2 wherein said oleophobic fabric barrier has a plurality of pores.

8. A valveless fuel tank assembly as set forth in claim 1 including a grade vent line having one end connected to said fuel tank and another end connected to said tank vent tube.

9. A valveless fuel tank assembly as set forth in claim 1 including a grade vent line having one end connected to said fuel tank and another end connected to said fill-limit tube.

10. A valveless fuel tank assembly as set forth in claim 1 including a grade vent line having one end connected to said fuel tank and another end connected to said oleophobic filter.

11. A valveless fuel tank assembly as set forth in claim 1 including a grade vent line having one end connected to said fuel tank and another end connected to said vapor canister.

12. A valveless fuel tank assembly for a vehicle comprising:
    a fuel tank having an interior chamber to hold fuel therein;
    a vapor canister to adsorb fuel vapor in said fuel tank;
    a fill-limit tube connected to said fuel tank and communicating with said interior chamber;
    a tank vent tube connected to said vapor canister and operatively connected to said fill-limit tube; and
    an oleophobic filter comprising a housing and an oleophobic fabric barrier having a plurality of pores and disposed in said housing, said oleophobic filter being connected to at least one of said fill-limit tube and said tank vent tube to allow vapor fuel to communicate with said vapor canister and to prevent liquid fuel from communicating with said vapor canister.

13. A valveless fuel tank assembly as set forth in claim 12 wherein said oleophobic filter is disposed within said tank vent tube.

14. A valveless fuel tank assembly as set forth in claim 12 wherein said oleophobic filter is connected to one end of said fill-limit tube and disposed in said interior chamber of said fuel tank.

15. A valveless fuel tank assembly as set forth in claim 12 wherein said oleophobic filter is connected to one end of said tank vent tube and disposed in said vapor canister.

16. A valveless fuel tank assembly as set forth in claim 12 wherein said vapor canister and said fill-limit tube are disposed in said interior chamber of said fuel tank.

17. A valveless fuel tank assembly as set forth in claim 12 including a grade vent line having one end connected to said fuel tank and another end connected to said tank vent tube.

18. A valveless fuel tank assembly as set forth in claim 12 including a grade vent line having one end connected to said fuel tank and another end connected to said oleophobic filter.

19. A valveless fuel tank assembly as set forth in claim 12 including a grade vent line having one end connected to said fuel tank and another end connected to said vapor canister.

20. A valveless fuel tank assembly for a vehicle comprising:
- a fuel tank having an interior chamber to hold fuel therein;
- a vapor canister to adsorb fuel vapor in said fuel tank;
- a fill-limit tube connected to said fuel tank and communicating with said interior chamber;
- a tank vent tube connected to said vapor canister and operatively connected to said fill-limit tube; and
- an oleophobic filter comprising a housing and an oleophobic fabric barrier having a plurality of pores and disposed in said housing, said oleophobic filter being connected to at least one of said fill-limit tube and said tank vent tube to allow vapor fuel to communicate with said vapor canister and to prevent liquid fuel from communicating with said vapor canister.

* * * * *